(12) United States Patent
Barasa

(10) Patent No.: US 8,745,967 B2
(45) Date of Patent: Jun. 10, 2014

(54) SYSTEM AND METHOD FOR CONTROLLING EXHAUST REGENERATION

(75) Inventor: Patrick Barasa, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 13/464,307

(22) Filed: May 4, 2012

(65) Prior Publication Data

US 2013/0291516 A1 Nov. 7, 2013

(51) Int. Cl.
*F01N 3/20* (2006.01)

(52) U.S. Cl.
USPC .......... 60/274; 60/285; 60/286; 60/295; 60/299; 60/303; 60/320

(58) Field of Classification Search
USPC .......... 60/274, 285, 286, 287, 291, 295, 297, 60/299, 300, 303, 311, 320
See application file for complete search history.

(56) References Cited

U.S. PATENT DOCUMENTS 5,950,422 A * 9/1999 Dolling .................. 60/274

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

A system for controlling regeneration in an after-treatment component comprises a feedback module, an error module, a gain module, and a regeneration control module. The feedback module is configured for determining a rate of change of the value of a controlled parameter. The error module is in communication with the feedback module and is configured for determining a value of an error term by subtracting a value of a target parameter from the value of the controlled parameter. The gain module is configured for determining a value of a proportional gain factor by raising a mathematical constant "e" to the negative power of the value of a tuned gain exponent and for determining a value of a derivative gain factor by multiplying the value of the proportional gain factor by a tuning factor. The regeneration control module is configured for determining a value of a rational control increment.

20 Claims, 2 Drawing Sheets

SYSTEM AND METHOD FOR CONTROLLING EXHAUST REGENERATION

FIELD OF THE INVENTION

The subject invention relates to vehicle exhaust systems, and more particularly to systems and methods for controlling exhaust regeneration in an after-treatment component of an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion in a diesel engine, an air/fuel mixture is delivered through an intake valve to cylinders and is compressed and combusted therein. After combustion, the pistons force the exhaust gas in the cylinders into an exhaust system. The exhaust gas may contain particulate matter, oxides of nitrogen (NOx), and carbon monoxide (CO), and the emission of these constituents is regulated for environmental reasons. Thus, vehicles equipped with compression-ignition engines often include after-treatment components for converting, reducing and/or removing particulate matter and other regulated constituents from their exhaust streams. Exhaust gas treatment systems may employ catalysts in one or more components configured for accomplishing an after-treatment process such as reducing NOx to produce more tolerable exhaust constituents of nitrogen (N2) and water (H2O). Reductant may be added to the exhaust gas upstream from an after-treatment component to aid in reduction of the NOx. A Diesel Particulate Filter (DPF) may be employed to capture soot, and that soot may be periodically incinerated during regeneration cycles.

Particulate filters, and other after-treatment components can be effective, but can also increase back pressure as they collect particulate matter, which may include ash and unburned carbon particles generally referred to as soot. As this carbon-based particulate matter accumulates in the after-treatment components, it can increase back pressure in the exhaust system. Engines that have large rates of particulate mass emission can develop excessive back pressure levels in a relatively short period of time, decreasing engine efficiency and power producing capacity. Therefore, it is desired to have particulate filtration systems that minimize back-pressure while effectively capturing particulate matter in the exhaust.

To accomplish both of these competing goals, after-treatment components must be regularly monitored and maintained either by replacing components or by removing the accumulated soot. Cleaning the accumulated soot from an after-treatment component can be achieved via oxidation to CO2 (i.e., burning-off) and is known in the art as regeneration. To avoid service interruptions, regeneration is generally preferred over replacement of after-treatment components. A continuously regenerating trap (CRT) is an after-treatment component that traps particles in the exhaust stream and also includes a catalyst to aid in regeneration.

One way that regeneration may be facilitated is by increasing the temperatures of the filter material and/or the collected particulate matter to levels above the combustion temperature of the particulate matter. Elevating the temperature facilitates consumption of the soot by allowing the excess oxygen in the exhaust gas to oxidize the particulate matter. The regeneration process can be either passive or active. In passive systems, regeneration occurs whenever heat (e.g., carried by the exhaust gasses) and soot (e.g., trapped in the after-treatment components) are sufficient to facilitate oxidation. In active systems, regeneration is induced at desired times by introducing heat from an outside source (e.g., an electrical heater, a fuel burner, a microwave heater, and/or from the engine itself, such as with a late in-cylinder injection or injection of fuel directly into the exhaust stream). Active regeneration can be initiated during various vehicle operations and exhaust conditions. Among these favorable operating conditions are stationary vehicle operations such as when the vehicle is at rest, for example, during a refueling stop.

Some diesel engine systems use cylinder injectors to control temperatures in after-treatment components by adding excess fuel in the cylinder with the intention that the additional fuel be available for increasing temperatures in the after-treatment component. Other diesel engine systems are equipped with after-treatment fuel injector(s), also known as a Hydrocarbon Injector (HCI), to support DPF regeneration by adding fuel directly to the engine exhaust system. Typically, the HCI is used only during DPF regeneration and is commanded on by the engine control system and injects fuel directly into the engine's exhaust gases downstream of the engine's turbocharger, if so equipped. The HCI supplies a measured quantity of fuel into the exhaust gas only during enabled regeneration events. An oxidation catalyst (DOC) converts this added fuel into the heat that's needed to regenerate the DPF by incinerating accumulated soot. DOC temperatures are monitored during regeneration by exhaust gas temperature sensors.

Engine control systems can be used to predict not only when it may be advantageous to actively facilitate a regeneration event, but also to effectuate control over the regeneration process. To exercise active control over a regeneration event, an engine control system often seeks to achieve a desirable temperature in the after-treatment component, or on the DOC, that is conducive to the regeneration process. To accomplish stable control, an engine control module may rely upon a feedback controller such as a proportional-integral-derivative (PID) controller, which calculates an error value as a difference between a measured process variable, such as catalyst temperature, and a desired setpoint. The controller adjusts one or more process variables, such as HCI quantity, seeking to minimize the value of the error until it is within an acceptable tolerance.

Unfortunately, substantial tuning may be required in order to enable a PID controller to provide a stable, responsive control system. For example, if the gains in a PID-based after-treatment regeneration controller are not set properly, HCI may be increased too rapidly, leading to overshoot. If the controller were to repeatedly make excessively large changes to HCI demanded, the desired catalyst temperature may be overshot such that the catalyst temperature oscillates around the desired temperature rather than approaching it. If the oscillations increase over time, then the system is unstable. If the oscillations steadily decrease in magnitude, then the control may be sufficiently stable so long as equilibrium can eventually be achieved. In the case of PID-based after-treatment regeneration controllers, the amount of calibration work required for tuning to achieve a sufficiently stable and responsive control system can be cumbersome and excessive, often requiring use of numerous maps and correction curves, each requiring detail on the order of hundreds of calibration data points in order to produce suitable control stability and response.

Accordingly, it would be desirable to have an improved system and method for controlling regeneration in an after-treatment system.

SUMMARY OF THE INVENTION

In one exemplary embodiment of the invention, a method for controlling regeneration in an after-treatment component of an exhaust system, wherein the component comprises a catalyst, comprises determining a first value of a controlled parameter at a first time, determining a second value of the controlled parameter at a second time occurring a time increment after the first time, and determining a rate of change of the value of the controlled parameter by dividing a difference between the first value of the controlled parameter and the second value of the controlled parameter by the time increment. A value of an error term is determined by subtracting a value of the target parameter from a current value of the controlled parameter. A value of a gain exponent is determined by dividing a thermal inertia of an exhaust stream flowing through the exhaust system by a thermal inertia of the catalyst. A value of a tuned gain exponent is determined by multiplying the value of the gain exponent by a tuning factor. A value of a proportional gain factor is determined as $e^x$, wherein e is a mathematical constant "e", and wherein x is (−1) multiplied by the value of the tuned gain exponent. A value of a derivative gain factor is determined by multiplying the value of the proportional gain factor by the tuning factor. A value of a derivative control parameter is determined by multiplying the rate of change of the controlled parameter by the value of the derivative gain factor. A value of a proportional control parameter is determined by multiplying the value of the error term by the value of the proportional gain factor. A value of a raw control increment is determined by adding the value of the derivative control parameter to the value of the proportional control parameter. A value of a rational control increment is determined by multiplying the raw control increment by the thermal inertia of the exhaust stream. Finally, the controlled parameter is adjusted based on the value of the rational control increment.

In another exemplary embodiment of the invention, a system for controlling regeneration in an after-treatment component of an exhaust system, wherein the component comprises a catalyst, comprises a feedback module, an error module, a gain module, and a regeneration control module. The feedback module is configured for determining a first value of a controlled parameter at a first time, determining a second value of the controlled parameter at a second time occurring a time increment after the first time, and determining a rate of change of the value of the controlled parameter by dividing a difference between the first value of the controlled parameter and the second value of the controlled parameter by the time increment. The error module is in communication with the feedback module and is configured for determining a value of an error term by subtracting a value of a target parameter from a current value of the controlled parameter. The gain module is configured for determining a value of a gain exponent by dividing a thermal inertia of the exhaust stream by a thermal inertia of the catalyst. The gain module is also configured for determining a value of a tuned gain exponent by multiplying the value of the gain exponent by a tuning factor, determining a value of a proportional gain factor as $e^x$, wherein e is a mathematical constant "e", and wherein x is (−1) multiplied by the value of the tuned gain exponent, and determining a value of a derivative gain factor by multiplying the value of the proportional gain factor by the tuning factor. The regeneration control module is in communication with the error module and the gain module and is configured for determining a value of a derivative control parameter by multiplying the rate of change of the controlled parameter by the value of the derivative gain factor. The regeneration control module is also configured for determining a value of a proportional control parameter by multiplying the value of the error term by the value of the proportional gain factor, determining a value of a raw control increment by adding the value of the derivative control parameter to the value of the proportional control parameter, and determining a value of a rational control increment by multiplying the raw control increment by the thermal inertia of the exhaust stream.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
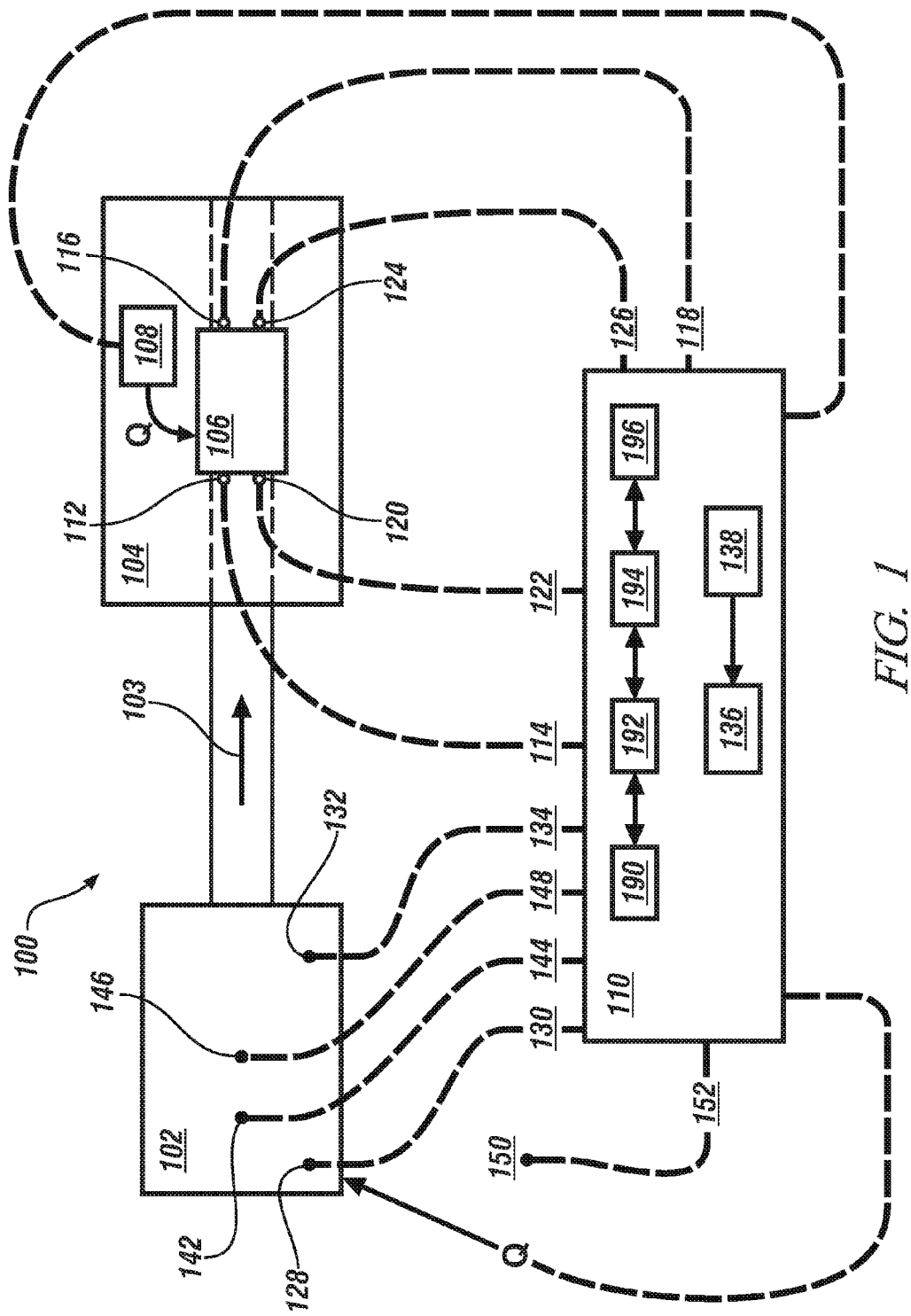
FIG. 1 is a functional block diagram of an engine control system including an exhaust control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In accordance with an exemplary embodiment of the invention, the present disclosure provides an improved system and method for controlling regeneration in an after-treatment component. FIG. 1 shows an exemplary system 100 for controlling regeneration within an after-treatment component of a compression-ignition engine 102 of a vehicle (not shown). The compression-ignition engine 102 is coupled to an exhaust system 104, through which exhaust 103 from engine 102 passes and is treated before being discharged to the atmosphere. Exhaust system 104 is configured for the reduction of regulated exhaust gas constituents and thus includes at least one after-treatment component 106 such as a particulate filter for removing particulate matter and other regulated constituents from the exhaust stream. As can be appreciated, the after-treatment components, systems, models, and controls described herein can be implemented in various engine systems. Such engine systems may include, for example, but are not limited to, diesel engines, gasoline direct injection systems, and homogeneous charge compression ignition engine systems.

In an exemplary embodiment, the after-treatment component 106 is a continuously regenerating trap (CRT), which includes both an oxidation catalyst (OC) and a particulate filter. The OC of the CRT 106 may include, for example, a flow-through metal or ceramic monolith substrate. The substrate may be packaged in a shell or canister having an inlet for receiving exhaust from engine 102 and an outlet in fluid communication with the particulate filter of the CRT 106. The substrate may include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC treats unburned gaseous and non-volatile HC and CO, which are oxidized to form CO and H2O.

The particulate filter portion of the after-treatment component 106 operates to filter the exhaust gas 103 of carbon and other particulates. In various embodiments, the particulate filter portion of the after-treatment component 106 may be constructed using a wall flow monolith filter or other filter devices such as wound or packed fiber filters, open cell foams, sintered metal fibers, etc. The filter may be packaged in the shell or canister and may have an inlet in fluid communication with the OC and an outlet for discharging treated exhaust gas 103.

The accumulation of particulate matter within the particulate filter portion of the after-treatment component 106 is periodically cleaned, or regenerated. Regeneration involves the oxidation or burning of the accumulated carbon and other particulates in what is typically a high temperature (>600° C.) environment. The oxidation within the OC generates the high temperatures needed for regeneration.

As shown in FIG. 1, a heater 108 is configured for adding heat (e.g., heat via a heat exchanger, additional fuel) to the after-treatment component 106 to actively induce regeneration in the after-treatment component 106. An engine control system 110 is configured to predict when it may be necessary or advantageous to undergo regeneration in the after-treatment component and, when appropriate, to actively facilitate a regeneration event. The engine control system 110 may facilitate such an event, for example, by introducing heat to the after-treatment component 106 from an outside source such as the heater 108, which may be configured to cause injection of fuel into the engine 102 or the exhaust system 104.

To enable the engine control system 110 to better perform its functions, various instruments are positioned within the engine 102 and the exhaust system 104. The instruments are configured to be responsive to changes in relevant parameters in the engine 102 and the exhaust system 104 and to transmit signals to the engine control system 110 with the signals being indicative of operation of the engine 102 and the after-treatment component 104. For example, in an exemplary embodiment, an upstream pressure sensor 112 measures pressures of the exhaust stream upstream from the after-treatment component 106 and produces upstream pressure signals 114. Similarly, a downstream pressure sensor 116 measures pressures of the exhaust stream downstream from the after-treatment component 106 and produces downstream pressure signals 118. In addition, an upstream temperature sensor 120 measures temperatures of the exhaust stream upstream from the after-treatment component 106 and produces upstream temperature signals 122.

A downstream temperature sensor 124 measures temperatures of the exhaust stream downstream from the after-treatment component 106 and produces downstream temperature signals 126. It should be appreciated that the downstream temperature signals 126 may reflect temperatures of the exhaust gas 103 or may reflect temperatures of an oxidation catalyst of the after-treatment component 106. An engine speed sensor 128 senses speeds of the engine 102 and produces engine speed signals 130. An engine flow sensor 132 senses mass flow rates of working fluid (e.g., air or air and fuel or exhaust gas) 103 flowing in the engine 102 or exhaust system 104 and produces engine flow rate signals 134. An engine intake air temperature sensor 142 senses a temperature of combustion air entering the engine 102 and produces intake air temperature signals 144. A downstream charge air cooler temperature sensor 146 senses a temperature of combustion air downstream from a charge air cooler associated with the stream of combustion air entering the engine 102 and produces a charge air temperature signal 148. An environmental temperature sensor 150 senses a temperature of the ambient environment in which engine 102 operates and produces an environmental temperature signal 152.

The engine control system 110 receives information, such as one or more of the upstream pressure signals 114, downstream pressure signals 118, upstream temperature signals 122, downstream temperature signals 126, engine speed signals 130, engine flow rate signals 134, intake air temperature signals 144, charge air temperature signals 148, and environmental temperature signals 152 from the upstream pressure sensor 112, the downstream pressure sensor 116, the upstream temperature sensor 120, the downstream temperature sensor 124, the engine speed sensor 128, the engine flow sensor 132, the engine intake air temperature sensor 142, the downstream charge air cooler temperature sensor 146, and the environmental temperature sensor 150. A processor 136 of the engine control system 110 cooperates with a memory 138 associated with the engine control system 110 to execute instructions that are configured to enable the engine control system 110 to facilitate effective monitoring, diagnosis and control over operation of the after-treatment component 106, including determining or anticipating when regeneration in the after-treatment component 106 may be necessary or desirable, facilitating regeneration in the after-treatment component 106, and/or controlling a regeneration process or other remedial measures.

In an exemplary embodiment, an engine control system 110 comprises a feedback module 190, an error module 192, a gain module 194, and a regeneration control module 196. The feedback module 190 is configured for determining a first value of a controlled parameter at a first time, determining a second value of the controlled parameter at a second time occurring a time increment after the first time, and determining a rate of change of the value of the controlled parameter by dividing a difference between the first value of the controlled parameter and the second value of the controlled parameter by the time increment. The error module 192 is in communication with the feedback module 190 and is configured for determining a value of an error term by subtracting a value of a target parameter from the value of the controlled parameter. In an exemplary embodiment, the controlled parameter is a sensed temperature of the catalyst, and the target parameter is a desired temperature of the catalyst.

The gain module 194 is configured for determining a value of a gain exponent by dividing a thermal inertia of the exhaust stream by a thermal inertia of the catalyst. The gain module 194 is also configured for determining a value of a tuned gain exponent by multiplying the value of the gain exponent by a tuning factor, determining a value of a proportional gain factor by raising the mathematical constant "e" (i.e., Euler's number, 2.71828. . . ) to the negative power of the value of the tuned gain exponent, and determining a value of a derivative gain factor by multiplying the value of the proportional gain factor by the tuning factor.

In an exemplary embodiment, the gain module 194 is configured for determining a thermal inertia of the exhaust stream by multiplying a mass flow rate of the exhaust stream by a specific heat of the exhaust stream and for determining a thermal inertia of the catalyst by multiplying a mass of the catalyst by a specific heat of the catalyst. In an exemplary embodiment, the gain module 194 is configured for determining the tuning factor based on empirical data. The gain module 194 may be configured for determining the tuning factor so as to provide stable control over the target parameter, and, still further, so as to provide critically damped control over the target parameter. The gain module 194 may be configured for dividing the value of the gain exponent in half.

The regeneration control module 196 is in communication with the error module 192 and the gain module 194 and is configured for determining a value of a derivative control parameter by multiplying the rate of change in the controlled parameter by the value of the derivative gain factor. The regeneration control module 196 is also configured for determining a value of a proportional control parameter by multiplying the value of the error term by the value of the proportional gain factor, determining a value of a raw control increment by adding the value of the derivative control parameter to the value of the proportional control parameter, and determining a value of a rational control increment by multiplying the raw control increment by the thermal inertia of the exhaust stream. In an exemplary embodiment, the rational control increment may be used to represent a change in the quantity of fuel to be injected into the exhaust stream. Additionally, the rational control increment may be used to drive addition of heat through other means such as heater 108.

Figure 2:
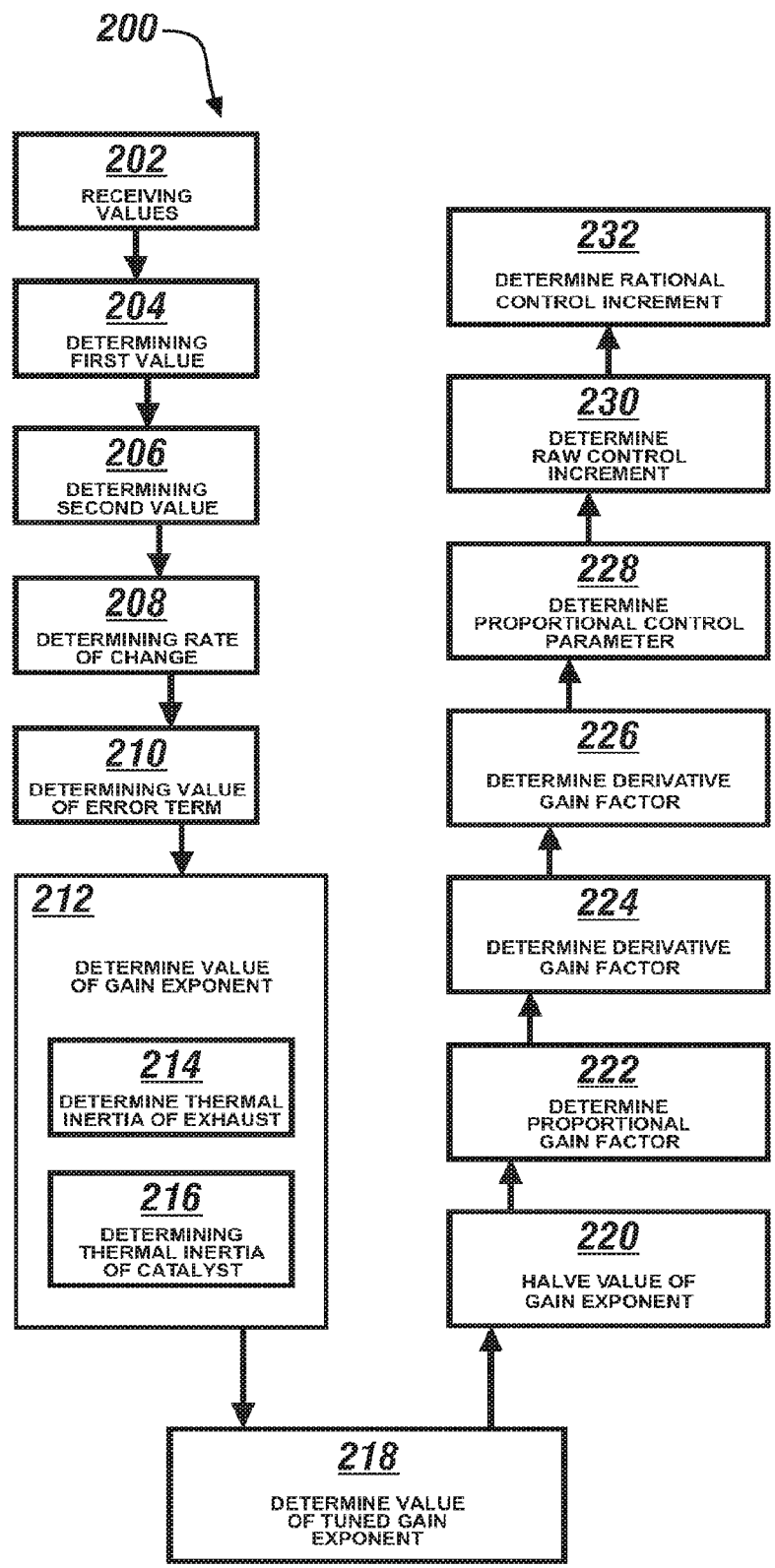
FIG. 2 is a functional block diagram of an exemplary implementation of a control module of the exhaust control system of FIG. 1.

In accordance with an exemplary embodiment of the invention, as shown in FIG. 2, an exemplary process 200 for controlling regeneration within an after-treatment component of a compression-ignition engine includes the step of receiving one or more values of one or more parameters associated with an exhaust stream passing through the after-treatment component (step 202). In an exemplary embodiment, the parameter may represent upstream pressure, downstream pressure, change in pressure across the after-treatment component, upstream temperature, downstream temperature, oxidation catalyst temperature, engine speed, or engine flow rate.

The value may be received as a signal from the upstream pressure sensor 112, the downstream pressure sensor 116, the upstream temperature sensor 120, the downstream temperature sensor 124, the engine speed sensor 128, or the engine flow sensor 132, or a combination based thereon. The parameter may be a pressure decrease index indicative of a decrease in pressure of an exhaust stream as it passes through the after-treatment component, a flow rate index indicative of a rate of flow of the exhaust stream, and/or a temperature index indicative of a temperature of the exhaust stream or the oxidation catalyst.

In addition to receiving one or more sensed values, the process 200 includes determining a first value of a controlled parameter at a first time (step 204), determining a second value of the controlled parameter at a second time occurring a time increment after the first time (step 206), and determining a rate of change of the value of the controlled parameter by dividing a difference between the first value of the controlled parameter and the second value of the controlled parameter by the time increment (step 208).

In an exemplary embodiment, a value of an error term is determined by subtracting a value of the target parameter from a value of the controlled parameter (step 210). In an exemplary embodiment, the controlled parameter is a sensed temperature of the oxidation catalyst, and the target parameter is a desired temperature of the oxidation catalyst.

In an exemplary embodiment, a value of a gain exponent is determined by dividing a thermal inertia of the exhaust stream by a thermal inertia of the catalyst (step 212). A thermal inertia of the exhaust stream may be determined by multiplying a mass flow rate of the exhaust stream by a specific heat of the exhaust stream (step 214). A thermal inertia of the catalyst may be determined by multiplying a mass of the catalyst by a specific heat of the catalyst (step 216).

In an exemplary embodiment, a value of a tuned gain exponent is determined by multiplying the value of the gain exponent by a tuning factor (step 218). It should be noted that the tuning factor may be predetermined based on empirical data and may be configured so as to provide stable control over the target parameter and further so as to provide critically damped control over the target parameter. In an exemplary embodiment, the value of the gain exponent is divided in half (step 220).

A value of a proportional gain factor is determined by raising the mathematical constant "e" (i.e., Euler's number, 2.71828. . . ) to the negative power of the value of the tuned gain exponent (step 222). A value of a derivative gain factor is determined by multiplying the value of the proportional gain factor by the tuning factor (step 224).

A value of a derivative control parameter is determined by multiplying the rate of change in the controlled parameter by the value of the derivative gain factor (step 226). A value of a proportional control parameter is determined by multiplying the value of the error term by the value of the proportional gain factor (step 228). A value of a raw control increment is determined by adding the value of the derivative control parameter to the value of the proportional control parameter (step 230). A value of a rational control increment is determined by multiplying the raw control increment by the thermal inertia of the exhaust stream (step 232). In an exemplary embodiment, the rational control increment represents a change in the quantity of fuel to be injected into, or heat to be added to, the exhaust stream.

Accordingly, an improved system and method for controlling regeneration in an after-treatment system are provided while avoiding the complexity and other difficulties associated with use of calibration curves and other conventional techniques for enabling a PID controller to provide stable and responsive control over the regeneration process. The invention provides for stable and responsive control over the regeneration process in the form of a direct calculation based on measured feedback while allowing for fine tuning of gain parameters through the use of a tuning factor.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration in an after-treatment component of an exhaust system, the component comprising a catalyst, the method comprising:

determining a first value of a controlled parameter at a first time;

determining a second value of the controlled parameter at a second time occurring a time increment after the first time;

determining a rate of change of the value of the controlled parameter by dividing a difference between the first value of the controlled parameter and the second value of the controlled parameter by the time increment;

determining a value of an error term by subtracting a value of a target parameter from a current value of the controlled parameter;

determining a value of a gain exponent by dividing a thermal inertia of an exhaust stream flowing through the exhaust system by a thermal inertia of the catalyst;

determining a value of a tuned gain exponent by multiplying the value of the gain exponent by a tuning factor;

determining a value of a proportional gain factor as $e^x$, wherein e is a mathematical constant "e", and wherein x is (−1) multiplied by the value of the tuned gain exponent;

determining a value of a derivative gain factor by multiplying the value of the proportional gain factor by the tuning factor;

determining a value of a derivative control parameter by multiplying the rate of change of the controlled parameter by the value of the derivative gain factor;

determining a value of a proportional control parameter by multiplying the value of the error term by the value of the proportional gain factor;

determining a value of a raw control increment by adding the value of the derivative control parameter to the value of the proportional control parameter;

determining a value of a rational control increment by multiplying the raw control increment by the thermal inertia of the exhaust stream; and adjusting the controlled parameter based on the value of the rational control increment.

2. A method as in claim 1, wherein the controlled parameter is a sensed temperature of the catalyst.

3. A method as in claim 1, wherein the target parameter is a desired temperature of the catalyst.

4. A method as in claim 1, wherein the thermal inertia of the exhaust stream is determined by multiplying a mass flow rate of the exhaust stream by a specific heat of the exhaust stream.

5. A method as in claim 1, wherein the thermal inertia of the catalyst is determined by multiplying a mass of the catalyst by a specific heat of the catalyst.

6. A method as in claim 1, wherein the tuning factor is predetermined based on empirical data.

7. A method as in claim 1, wherein the tuning factor is determined so as to provide stable control over the target parameter.

8. A method as in claim 1, wherein the tuning factor is determined so as to provide critically damped control over the target parameter.

9. A method as in claim 1, wherein the rational control increment represents a change in a quantity of fuel to be injected into the exhaust stream.

10. A method as in claim 1, further comprising dividing the value of the gain exponent in half.

11. A system for controlling regeneration in an after-treatment component of an exhaust system, the component comprising a catalyst, the system comprising a processor coupled to a memory and including logic that, when executed:

determines a first value of a controlled parameter at a first time, determining a second value of the controlled parameter at a second time occurring a time increment after the first time, and determining a rate of change of the value of the controlled parameter by dividing a difference between the first value of the controlled parameter and the second value of the controlled parameter by the time increment;

determines a value of an error term by subtracting a value of a target parameter from a current value of the controlled parameter;

determines a value of a gain exponent by dividing a thermal inertia of an exhaust stream flowing through the exhaust system by a thermal inertia of the catalyst; determining a value of a tuned gain exponent by multiplying the value of the gain exponent by a tuning factor; determining a value of a proportional gain factor as $e^x$, wherein e is a mathematical constant "e", and wherein x is (−1) multiplied by the value of the tuned gain exponent; and determining a value of a derivative gain factor by multiplying the value of the proportional gain factor by the tuning factor; and determines a value of a derivative control parameter by multiplying the rate of change of the controlled parameter by the value of the derivative gain factor; determining a value of a proportional control parameter by multiplying the value of the error term by the value of the proportional gain factor; determining a value of a raw control increment by adding the value of the derivative control parameter to the value of the proportional control parameter; and determining a value of a rational control increment by multiplying the raw control increment by the thermal inertia of the exhaust stream; and adjusts the controlled parameter based on the value of the rational control increment.

12. A system as in claim 11, wherein the controlled parameter is a sensed temperature of the catalyst.

13. A system as in claim 11, wherein the target parameter is a desired temperature of the catalyst.

14. A system as in claim 11, wherein the thermal inertia of the exhaust stream is determined by multiplying a mass flow rate of the exhaust stream by a specific heat of the exhaust stream.

15. A system as in claim 11, wherein the thermal inertia of the catalyst is determined by multiplying a mass of the catalyst by a specific heat of the catalyst.

16. A system as in claim 11, wherein the tuning factor is determined based on empirical data.

17. A system as in claim 11, wherein the tuning factor is determined so as to provide stable control over the target parameter.

18. A system as in claim 11, wherein the tuning factor is determined so as to provide critically damped control over the target parameter.

19. A system as in claim 11, wherein the logic is further configured to facilitate a change in a quantity of fuel to be injected into the exhaust stream based on the value of the rational control increment.

20. A system as in claim 11, wherein the logic is further configured for dividing the value of the gain exponent in half.

* * * * *